United States Patent
Horesh et al.

(10) Patent No.: US 12,038,928 B2
(45) Date of Patent: Jul. 16, 2024

(54) EFFICIENT COUNTERFACTUAL SEARCH

(71) Applicant: Intuit Inc., Mountain View, CA (US)

(72) Inventors: Yair Horesh, Kfar Sava (IL); Aviv Ben Arie, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/978,174

(22) Filed: Oct. 31, 2022

(65) Prior Publication Data

US 2024/0143596 A1 May 2, 2024

(51) Int. Cl.
*G06F 16/2455* (2019.01)
*G06F 16/248* (2019.01)

(52) U.S. Cl.
CPC ...... *G06F 16/24556* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 10,467,261 B1* | 11/2019 | Doyle | G06F 16/248 |
| 2012/0158488 A1* | 6/2012 | Bottou | G06Q 30/0243 705/14.42 |
| 2013/0097706 A1* | 4/2013 | Titonis | G06F 21/566 726/22 |
| 2016/0147800 A1* | 5/2016 | Huang | G06F 12/0813 707/692 |
| 2017/0249532 A1* | 8/2017 | Okazaki | G06V 10/755 |
| 2019/0180029 A1* | 6/2019 | Copty | G06F 18/23 |
| 2020/0097997 A1* | 3/2020 | Li | G06N 20/00 |
| 2021/0397648 A1* | 12/2021 | Zornes | G06V 30/194 |
| 2022/0005604 A1* | 1/2022 | Son | G16H 50/20 |
| 2022/0067449 A1* | 3/2022 | Perera | G06N 3/047 |
| 2022/0067461 A1* | 3/2022 | Ampanavos | G06F 40/109 |
| 2022/0207352 A1* | 6/2022 | Barr | G06F 17/18 |
| 2022/0222260 A1* | 7/2022 | Lin | G06F 16/9535 |

* cited by examiner

*Primary Examiner* — Yu Zhao
(74) *Attorney, Agent, or Firm* — Lathrop GPM LLP

(57) ABSTRACT

A method implements efficient counterfactual search. The method includes receiving a request corresponding to an input vector, processing the input vector with a model to generate an output vector that does not correspond to a selected class, and processing the input vector using a component, of a plurality of components, to generate a counterfactual vector to the selected class. The plurality of components includes a number of dimensions that is less than a number of features of the input vector. The method further includes processing the counterfactual vector to generate a recommendation and presenting the recommendation.

20 Claims, 5 Drawing Sheets

EFFICIENT COUNTERFACTUAL SEARCH

BACKGROUND

Counterfactuals may be used to explain why a computational model did not provide an expected output (e.g., the output is not to a selected class or does not satisfy a threshold). Counterfactuals may be generated by adjusting the values of an input to a computational model until the adjusted input, when processed by the computational model, provides a selected output (e.g., an output to the selected class or that satisfies a threshold). Searching for counterfactuals by adjusting the values of inputs is a time consuming task that may take large amounts of computational resources. A challenge is to efficiently search for counterfactuals.

SUMMARY

In general, in one or more aspects, the disclosure relates to a method implementing efficient counterfactual search. The method includes receiving a request corresponding to an input vector, processing the input vector with a model to generate an output vector that does not correspond to a selected class, and processing the input vector using a component, of a plurality of components, to generate a counterfactual vector to the selected class. The plurality of components includes a number of dimensions that is less than a number of features of the input vector. The method further includes processing the counterfactual vector to generate a recommendation and presenting the recommendation.

In general, in one or more aspects, the disclosure relates to a system implementing efficient counterfactual search. The system includes a counterfactual controller configured to search for a counterfactual vector, a recommendation controller configured to generate a recommendation, and an application executing on one or more servers. The application is configured for receiving a request corresponding to an input vector, processing the input vector with a model to generate an output vector that does not correspond to a selected class, and processing, by the counterfactual controller, the input vector using a component, of a plurality of components, to generate a counterfactual vector to the selected class. The plurality of components includes a number of dimensions that is less than a number of features of the input vector. The application is further configured for processing, by the recommendation controller, the counterfactual vector to generate the recommendation and presenting the recommendation.

In general, in one or more aspects, the disclosure relates to a method using efficient counterfactual search. The method includes transmitting a request and receiving a response to the request. The response is generated by processing an input vector with a model to generate an output vector that does not correspond to a selected class; processing the input vector using a component, of a plurality of components, to generate a counterfactual vector to the selected class; processing the counterfactual vector to generate a recommendation; and presenting the recommendation. The method further includes displaying the response that includes the recommendation.

Other aspects of the invention will be apparent from the following description and the appended claims.

DETAILED DESCRIPTION

Figure 1:
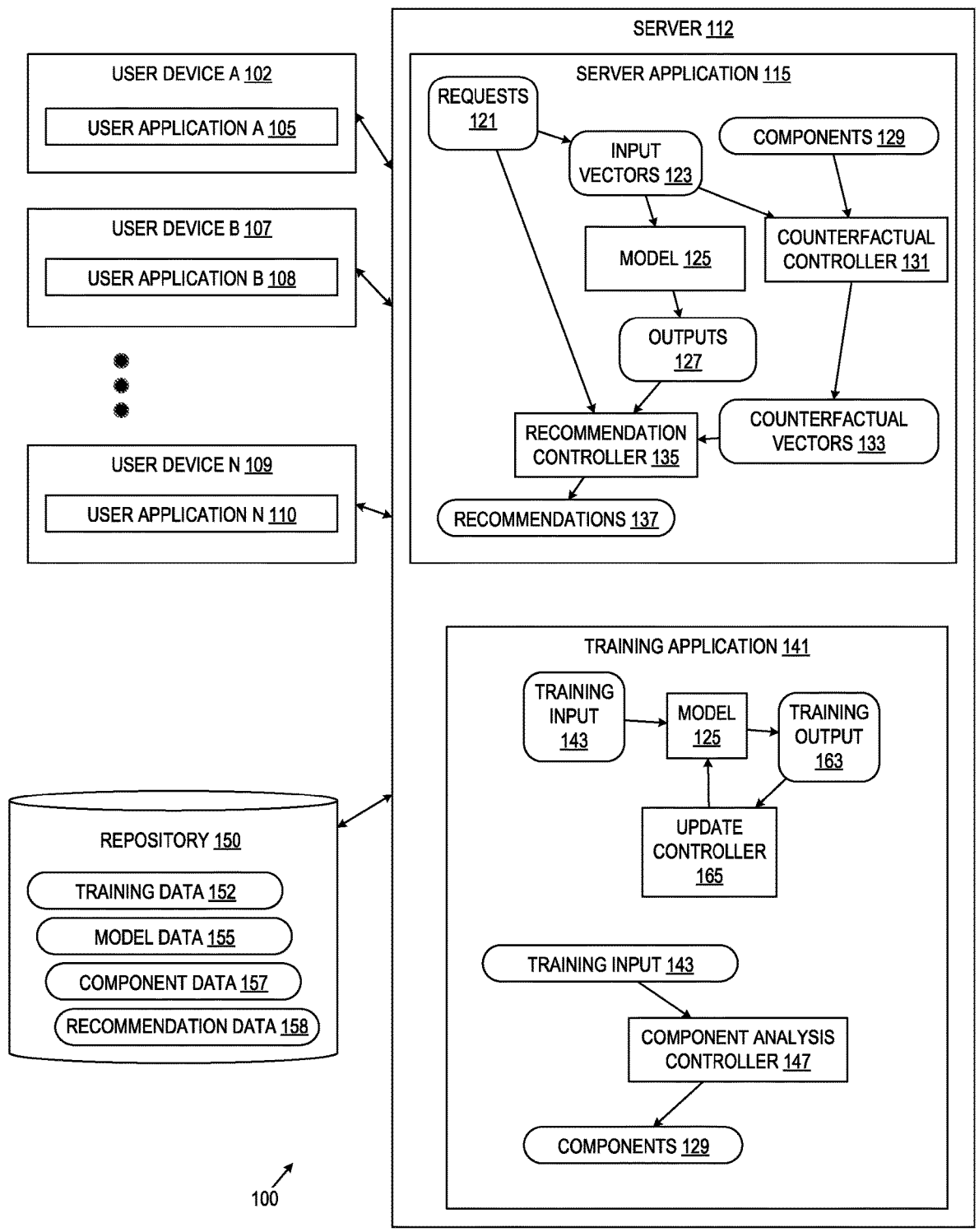
FIG. 1 shows a diagram of systems in accordance with disclosed embodiments.

In general, embodiments are directed to efficient counterfactual search. A counterfactual is a value that generates a different input with the model as compared to an original input. In order to search efficiently, system in accordance with the disclosure may reduce the number of dimensions used to search for counterfactuals. The number of dimensions may be reduced by performing a principal component analysis on a set of input data, e.g., the set of input data used to train a computational model. Reducing the number of dimensions may also increase the explainability of the output of a model. Instead of adjusting multiple features of an input vector, a counterfactual that is found using principal component analysis may be identified by adjusting a reduced number of features, which can be explained.

In one example, Harley Quinn ponders why a photo she captured of Superman (saving the day) with her new photography hobby is not generating as many likes as expected. The selfie image may be processed to extract an input vector that is processed with a model that outputs a prediction of the number of likes for the selfie, which is below a desired threshold. The system generates a counterfactual vector using a set of components. The set of components are the components (e.g., eigenvectors and eigenvalues) generated by performing a principal component analysis on a data set (e.g., a set of input vectors). The search space to find a counterfactual is reduced to the space defined by the set of components, which has fewer dimensions than the input vector. Recommendations may be made based on the changes that were made to the input vector in order to generate the counterfactual.

As another example, Superman may ponder why his loan application did not get accepted, even after saving the day. An input vector generated from his application information may have been processed by a computer implemented computational model that classifies the input vector as "not accepted" and does not provide a reason why. The system generates a counterfactual vector from the input vector using a set of components generated with principal component analysis and then generates recommendations for improving the application based on the changes made to the input vector to make the counterfactual vector.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of computer implemented models and counterfactual generation. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements efficient counterfactual search. The system (100) processes the requests (121) from the user devices A (102) and B (107) through N (109) with the server (112) to generate the recommendations (137). The system (100) includes the server (112), the user devices A (102) and B (107) through N (109), and the repository (150).

Figure 5A:
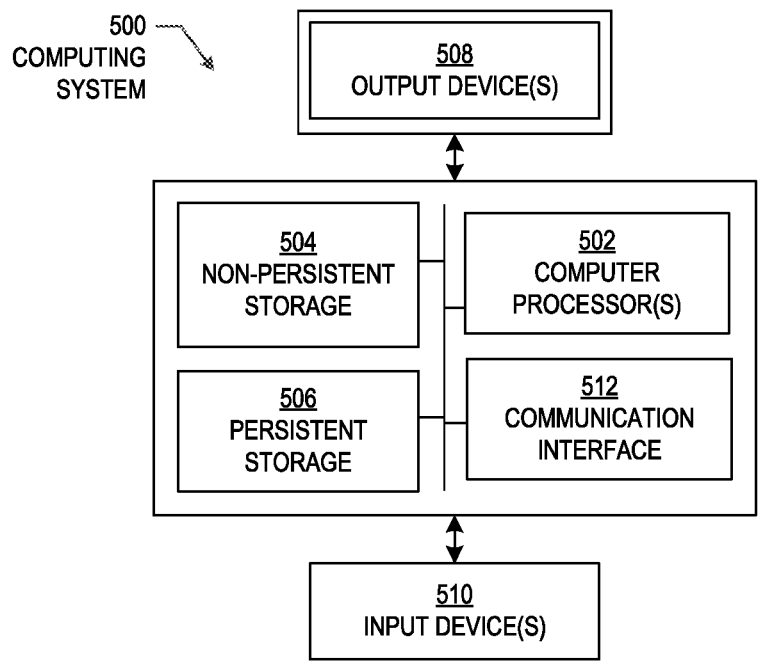
FIG. 5A and FIG. 5B show computing systems in accordance with disclosed embodiments.

The server (112) is a computing system (further described in FIG. 5A). The server (112) may include multiple physical and virtual computing systems that form part of a cloud computing environment. In one embodiment, execution of the instructions, programs, and applications of the server (112) is distributed to multiple physical and virtual computing systems in the cloud computing environment. The server (112) includes the server application (115).

The server application (115) is a collection of programs with instructions that may execute on multiple servers of a cloud environment, including the server (112). The server application (115) processes the requests (121) to generate the input vectors (123), processes the input vectors (123) and the components (129) to generate the outputs (127) and the counterfactual vectors (133), and processes the counterfactual vectors (133) to generate the recommendations (137). In one embodiment, the server application (115) hosts websites and may serve structured documents (hypertext markup language (HTML) pages, extensible markup language (XML) pages, JavaScript object notation (JSON) files and messages, etc.) to interact with the user devices A (102) and B (107) through N (109) to receive the requests (121) and present the recommendations (137). The server application (115) includes the model (125), the counterfactual controller (131), and the recommendation controller (135).

The requests (121) are requests from the user devices A (102) and B (107) through N (109) that include or identify information processed by the model (125). In one embodiment, the requests (121) include or reference image data (pictures, photos, images, etc.) that is processed by the model (125). In one embodiment, the requests (121) include or reference financial data (records of financial transactions, records of accounts, etc.).

The input vectors (123) are sets of input features extracted from data based on the requests (121). In one embodiment, the requests (121) include images and the input vectors (123) include image features extracted from the data of the image. The image features may include size, resolution, brightness, clarity, sharpness, saturation, hue, luminosity, image classification, etc. In one embodiment, the requests (121) include financial data and the input vectors (123) include financial features extracted from the financial data. The financial features may include records of transactions, statistical attributes (e.g., mean transaction value, mode of transaction type, etc.), account balances, monthly income, etc. The input vectors (123) may be generated with a feature extractor that processes the requests (121) with one or more numerical transformations and algorithms to generate the input vectors (123).

Different input features may represent different attributes of an input. With an image as an input, the attributes represented by input features may include size, resolution, brightness, clarity, sharpness, saturation, hue, luminosity, image classification, etc. With financial data as an input, attributes represented by input features may include transaction information, statistical attributes (e.g., mean transaction value, mode of transaction type, etc.), account balances, etc. The order and type of input features may be the same between different input vectors for the same type of data.

The model (125) is a collection of programs with instructions that may operate on the server (112). The model (125) processes the input vectors (123) and may process the counterfactual vectors (133) to generate the outputs (127). One of the input vectors (123) may correspond to one of the outputs (127) and one of the counterfactual vectors (133) may correspond to a different one of the outputs (127). The model (125) may be a machine learning model. In one embodiment, the model (125) may include a neural network that processes the input vectors (123) using neural network algorithms (convolutional algorithms, transformer algorithms, attention algorithms, recurrent algorithms, etc.).

The outputs (127) are the outputs of the model (125). The outputs (127) may be scaler values, vectors of scaler values, etc. In one embodiment, an output may be a scaler value that is a prediction of the number of clicks an image may generate on a social media website. In one embodiment, an output may be a scaler value that is a probability of repayment.

The counterfactual controller (131) is a collection of programs with instructions that may operate on the server (112). The counterfactual controller (131) processes the outputs (127) with the components (129) to generate the counterfactual vectors (133). In one embodiment, the counterfactual controller (131) searches for a counterfactual vector by adjusting values of an input vector along the dimensions of a vector space of the components (129) instead of along the dimensions of the vector space of the input vectors (123).

The components (129) are a set of components generated from the training input (143), which are used to train the model (125). In one embodiment, the components (129) are generated by performing a principal component analysis on the training input (143). In one embodiment, a component of the components (129) includes an eigenvector and an eigenvalue. In one embodiment, the eigenvectors map between the space of the input vectors (123) and the space of the components (129). In one embodiment, the eigenvalues identify the amount of variance in the space of the input vectors (123) that may be attributable to variance along the dimensions of the space of the components (129).

The counterfactual vectors (133) are modified versions of the input vectors (123). The counterfactual vectors (133) are modified from the input vectors (123) by adjusting the values of the input vectors (123) along the dimensions of the space of the components (129). A counterfactual vector further differs from the input vector used to generate the counterfactual vector by the output of the counterfactual vector. The output of the counterfactual vector is different from the output of the corresponding input vector.

The output of the counterfactual vector may be to a selected class or satisfy a threshold, whereas the output for the input vector may not be to the selected class or not satisfy the threshold. For example, an input vector may have an output that is below a threshold and a counterfactual vector generated from the input vector (by adjusting the values of the input vector along the dimensions of the components (129)) may have an output that is above the threshold. With the output of the input vector below the threshold, the input vector may not be part of the selected class. With the output of the counterfactual vector above the threshold, the counterfactual vector may be part of the selected class.

The recommendation controller (135) is a collection of programs with instructions that may operate on the server (112). The recommendation controller (135) processes the counterfactual vectors (133) to generate the recommendations (137). In one embodiment, the recommendation controller (135) uses the components (129) to determine the dimensions of the input vectors (123) that were changed in order to generate the counterfactual vectors (133). The changed dimensions may then be mapped to textual recommendations stored in the recommendation data (158) and presented as part of the recommendations (137).

The recommendations (137) identify changes that may be made to the data included with or identified by the requests (121) from which the input vectors (123) are extracted. A subsequent request that includes the changes may correspond to a selected output, e.g., to a selected class or that satisfies a threshold. The recommendations (137) are presented to the user devices A (102) and B (107) through N (109) so that a user may update inputs to the system (100).

The training application (141) is a collection of programs with instructions that may execute on multiple servers of a cloud environment, including the server (112). In one embodiment, the training application (141) and the server application (115) may operate at different times on different servers. The training application (141) generates the components (129) and trains the model (125). The model (125) is trained using the update controller (165) to improve the model (125). The components (129) are generated by the component analysis controller (147).

The training input (143) is the input used to train the model (125). The training input (143) may be a subset of the training data (152). The training input (143) may include training input vectors that are input to the model (125). The training input vectors may be in the same vector space as the input vectors (123).

The model (125) is the computational model being trained. The model (125) is used by the server application (115) to generate the outputs (127). The model (125) processes the training input (143) to generate the training output (163).

The training output (163) is the output of the model (125) generated from the training vectors (143). The training output (163) may be in the same space and dimensions as the outputs (127).

The update controller (165) updates the model (125). In one embodiment, the update controller (165) processes the training output (163) to generate updates for the model (125). One or more algorithms may be used by the update controller (165), including backpropagation, gradient descent, boosting, gradient boosting, etc.

The training input (143) may also be used by the component analysis controller (147). The training input (143) used by the component analysis controller (147) is in the same space as the input vectors (123).

The component analysis controller (147) is a collection of programs with instructions that may operate on the server (112). The component analysis controller (147) processes the training input (143) to generate the components (129). In one embodiment, the component analysis controller (147) performs a principal component analysis on the training vectors (143) to identify the components (129). When the system (100) utilizes multiple models, a set of components may be generated for each of the different models utilized by the system.

The components (129) are components of the training input (143). In one embodiment, the components (129) define a component space that has fewer dimensions than an input space defined by the training input (143) (which may include the input vectors (123)). In one embodiment, the component space is a projection of the input space having fewer dimensions than the input space. In one embodiment, a component (of the components (129)) may include an eigenvector and an eigenvalue.

In one embodiment, the eigenvector of a component maps an input vector from the input space to the dimension of the component of the component space. In one embodiment, the eigenvector of a component identifies weights for one or more of the dimensions of the input vectors (123). A larger weight for an input space dimension may correspond to a stronger correlation between the component and the input space dimension. As an example, an input space may have 100 dimensions and a component space may have 20 dimensions. The eigenvector for the first component (the first dimension of the component space) may be combined with (e.g., multiplied by) an input vector to determine the value for the first dimension of a component vector in the component space.

In one embodiment, the eigenvalue may identify the expected variation for a component. In one embodiment, the eigenvalue of a component identifies a correlation between variance of the component with variance of values from the training vectors (143) in the input space.

Continuing with FIG. 1, the user devices A (102) and B (107) through N (109) are computing systems (further described in FIG. 5A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used to generate an input that forms part of the requests (121). The input is processed by the system (100) to generate one of the recommendations (137). The recommendation may be presented to and displayed by the user application A (105).

Figure 5B:
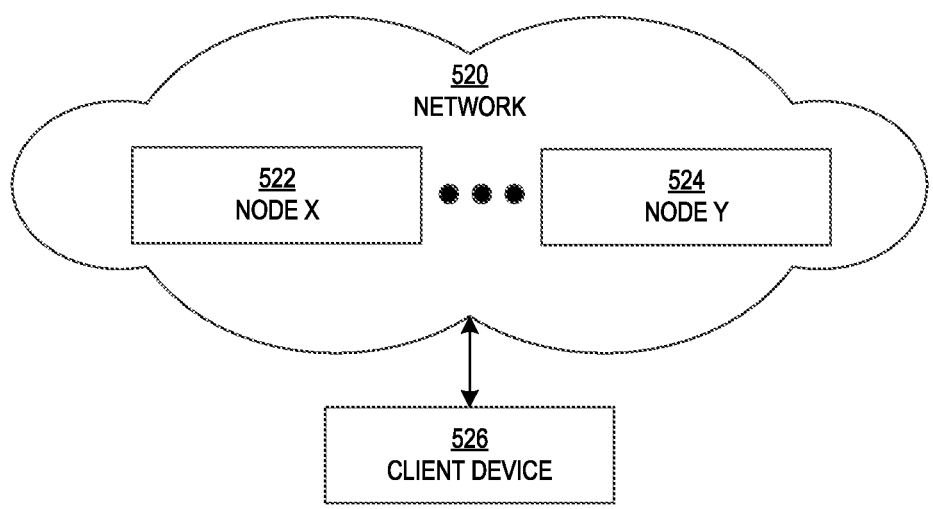

The repository (150) is a computing system that may include multiple computing devices in accordance with the computing system (500) and the nodes (522) and (524) described below in FIGS. 5A and 5B. The repository (150) may be hosted by a cloud services provider that also hosts the server (112). The cloud services provider may provide hosting, virtualization, and data storage services as well as other cloud services to operate and control the data, programs, and applications that store and retrieve data from the repository (150). The data in the repository (150) includes the training data (152), the model data (155), the component data (157), and the recommendation data (158).

The training data (152) is data used to train the model (125). In one embodiment, the training data (152) includes historical inputs and corresponding outputs that are used to improve the model (125).

The model data (155) is data that defines the model (125). The model data (155) may include parameters, weights, hyperparameters, etc., which may be updated by training the model (125).

The component data (157) is data that includes the components (129). In one embodiment, the component data (157) includes components generated by performing a principal component analysis on the training data (152).

The recommendation data (158) is data included in the recommendations (137) that are presented to the user devices A (102) and B (107) through N (109). The recommendation data (158) may include text descriptions of adjustments that may be made to input to the system (100) to achieve a result, i.e., to have an input generate an output to a selected class.

Although shown using distributed computing architectures and systems, other architectures and systems may be used. In one embodiment, the server application (115) may be part of a monolithic application that implements the modeling and management of affinity networks. In one embodiment, the user applications A (105) and B (108) through N (110) may be part of monolithic applications that implement and use affinity networks without the server application (115).

Figure 2:
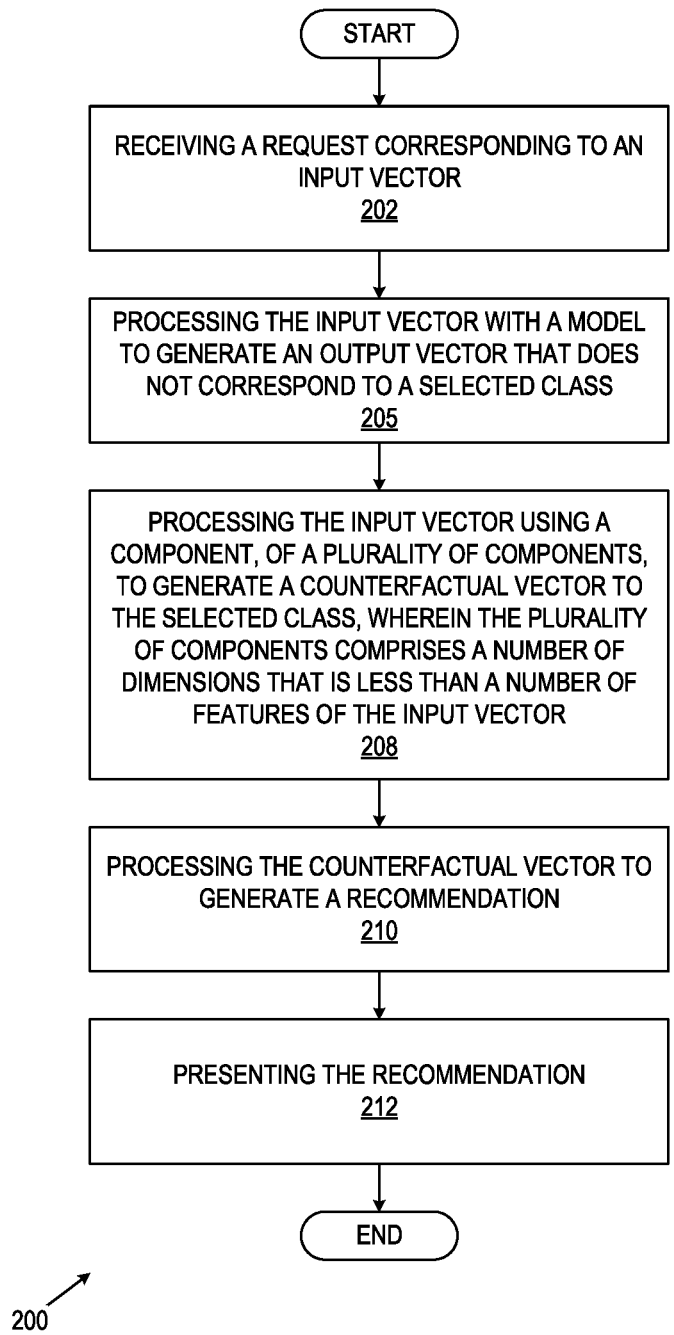
FIG. 2 shows a flowchart in accordance with disclosed embodiments.

Turning to FIG. 2, the process (200) uses counterfactual vectors. The process (200) may be performed by a computing device interacting with one or more additional computing devices. For example, the process (200) may execute on a server response to one or more user devices.

At Step 202, a request is received that corresponds to an input vector. In one embodiment, the request includes the input vector. In one embodiment, the request includes input data from which the input vector is generated. In one embodiment, the input data may include binary data, text data, link data, etc. The link data may include a link (e.g., a uniform resource locator (URL)) that identifies a location from which binary or text data may be accessed.

In one embodiment, an input variable is converted to a numeric value of the input vector. For example, a request may include categorical data that is mapped to numeric values. In one embodiment, the request may include image data that is processed to generate input features from the image data (e.g., brightness, etc.) with the values of the input features stored to values for dimensions of an input vector. In one embodiment, the request may include financial data that is processed to generate input features from the financial data (e.g., monthly income, etc.) with the values of the input features stored to dimensions of the input vector.

At Step 205, the input vector is processed with a model to generate an output. The output may not be to a selected class. In one embodiment, the model may be a computer implemented model using one or more machine learning algorithms. In one embodiment, the model may include a neural network. The model may utilize multiple data transformations to generate the output from the input vector. In one embodiment, the output is a scalar value. In one embodiment, the output is a vector of scalar values.

In one embodiment, the input vector is processed with a model using a machine learning algorithm. The model processes training input to generate training output and processing the training output to update the model to improve a characteristic of the model. The characteristic may be the accuracy of the model. Algorithms may use backpropagation, gradient descent, boosting, gradient boosting, etc.

At Step 208, the input vector is processed using a component, of multiple components, to generate a counterfactual vector. The counterfactual vector is to the selected class. The multiple components each include a number of dimensions that is less than the number of features of the input vector. The input vector is processed with a searching algorithm (a genetic search algorithm, KD-trees, etc.). Instead of searching the space and dimensions of the input vector, the space and dimensions of the components are used. With fewer dimensions in the component space than the feature space, the searching algorithm may use fewer computational resources to find the counterfactual vector. Additionally, the correlation between the dimensions of the component space to the dimensions of the feature space may be used to identify suggestions for improving the input to generate a preferred output.

In one embodiment, multiple training vectors are processed using principal component analysis to generate the components used to search for the counterfactual vector. A component (of the multiple components) includes a weight vector and an expected variance ratio. The weight vector may correspond to an eigenvector generated with the principal component analysis. The expected variance ratio may correspond to an eigenvalue generated with the principal component analysis. The weight vector may be used to determine the value for a component dimension from the input vector. For example, the input vector may be combined with the weight vector (e.g., a dot product) to identify the value for the component corresponding to a dimension in the component space. The expected variance ratio may be determined by dividing the eigenvalue of one component by the sum of the eigenvalues of the multiple components.

In one embodiment, a number of components is selected in which an explained variance ratio corresponding to the number of components satisfies a variance threshold. For example, with a threshold of 80% (other threshold may be used), if the sum of the expected variance ratios of the first three principal components is less than the threshold, then the process may continue until the sum of the expected variance ratios for the number of components is satisfies (e.g., is greater than) the threshold.

In one embodiment, the component from a set of components is recorded with linear connections between the component and a plurality of features of the input vector. For example, the eigenvector or a weight vector of the component may be recorded that identifies the linear connections between the component (i.e., a dimension of the component space) and the dimensions of the features (i.e., a dimension of an input vector).

In one embodiment, multiple sets of components (referred to as component sets) may be generated. Components sets with number of components from k to K−1 may be generated. "k" is a number of components satisfying a variance threshold (also referred to as the minimum number of components). "K" is the number of features of the input vector. In one embodiment, for each of the different number of components (e.g., 2 components, 3 components, . . . ) the principal component analysis algorithm may be executed to generate a set of components.

In one embodiment, duplicate components may be removed from the multiple component sets. A component may be a duplicate with another component when both of the components have similar weight vectors and correspond to the same feature dimension. For example, a cosine similarity that satisfies a threshold (e.g., greater than 0.5) may identify duplicate components that may be removed. Removing duplicate components prevents the system from searching the same (or similar) component dimension more than once.

In one embodiment, the counterfactual vector is generated by searching a feature space of the input vector using the linear connections between the input vector and the component to constrain adjustments to the input vector. In one embodiment, instead of adjusting the values of an input vector directly to search the input space, the process may adjust the values of the input vector using one or more of the components. In one embodiment, the value of a component may be calculated, then adjusted, and the adjustments transformed back into adjustments to the input vector to form an intermediate vector.

In one embodiment, the input vector may be transformed from the input space to a component space that includes dimensions for each components of a set of components to form a component space vector. Adjustments may be made to the values of one or more dimensions of the component space vector and the adjusted component space vector is transformed back to the input space to form an intermediate vector.

The intermediate vector is tested with the computational model to determine if the intermediate output (generated from the intermediate vector) is to the selected class or satisfies the threshold for the output. When the intermediate output satisfies the threshold or is to the selected class, then the intermediate vector may be recorded as a counterfactual vector for the corresponding input vector.

In one embodiment, a search for the counterfactual vector is initiated by starting with the component correspond to a highest explainable variance ratio. The order of the components that are adjusted to generate intermediate vectors may correspond to the order of the explainable variance ratios for the components. In one embodiment, the component with the highest eigenvalue may be used to search the feature space first, then the component with the next highest eigenvalue, and so on.

Different algorithms may be sued used to search the feature space for a counterfactual vector for an input vector using the components. Algorithms that may be used include genetic algorithms, k-d tree algorithms, etc.

At Step 210, the counterfactual vector is processed to generate a recommendation. In one embodiment, the counterfactual vector is processed by determining which dimensions of the input vector contained changes to generate the counterfactual vector. A mapping between recommendations (e.g., text strings) dimensions that are changed may be used to identify the recommendations from the changed dimensions. In one embodiment, a dimension may be mapped to multiple recommendations based on amount of the change made to the value for the dimension. For example, positive change may map to a recommendation of "increasing" the corresponding input and a negative change may map to a recommendation of "decreasing" the corresponding input.

When changes to multiple dimensions are made to the input vector, the recommendations may be ordered by the absolute amount of change. For example, with changes of "{D1:−1.2, D2:3.0, D3:−0.9}", the recommendation for dimension "D2" may be first, the recommendation for dimension "D1" may be second, and the recommendation for the dimension "D3" may be third.

At Step 212, the recommendation is presented. In one embodiment, the recommendation may be presented by transmitting the recommendation to a client device. The client device may display the recommendation in a graphical user interface. The graphical user interface may have been used to capture data for the request that triggered the generation of the recommendation.

In one embodiment, the recommendation is presented with a link. The link may be a URL. Selection of the link may trigger an action by the device displaying the link. For example, selecting the link may bring up an image manipulation program that alters an aspect of the image identified by the recommendation. In one embodiment, selecting the link may update and resubmit an application.

Figure 3:
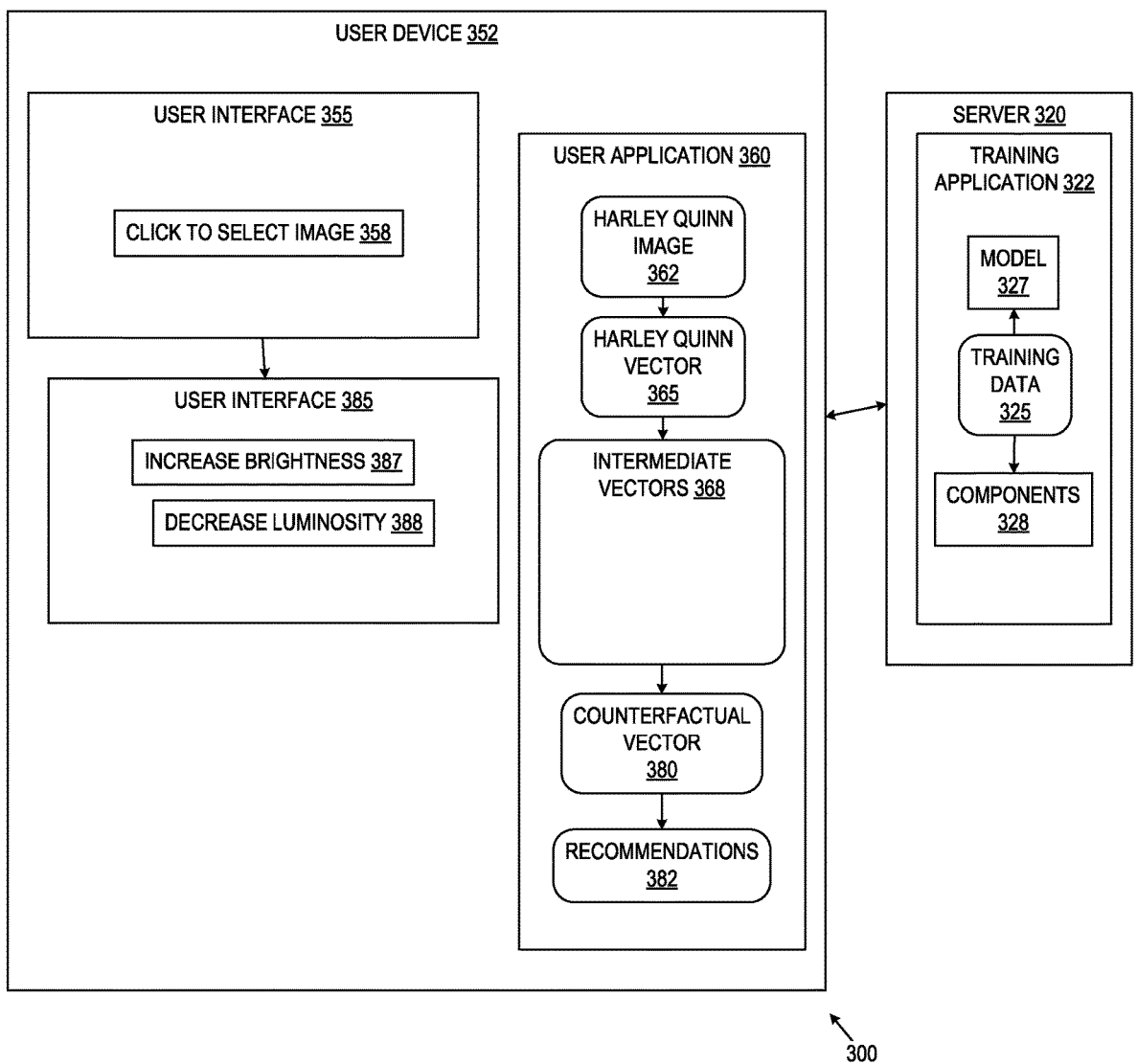
FIG. 3 and FIG. 4 show examples in accordance with disclosed embodiments.

Turning to FIG. 3, the system (300) processes images to provide recommendations to improve images. Harley Quinn sees Superman flying about in the rearview mirror of her purple sportscar and exits the highway to take his picture with her new photography equipment that she bought for her new photography hobby. Harley takes a selfie (the Harley Quinn image (362)) with Superman in the background while she smiles holding up the "V" sign. Before she uploads the image (362) to her social media, Harley decides to run the image through the user application (360) to see if there are any recommendations to improve the objective quality of the image (362) so that she doesn't embarrass herself.

The user application (360) is a program that discretely generates recommendations without transferring the original input data to a server. The recommendations (382) are generated on the user device (352) using the model (327) and the components (328) generated by the server (320).

The server (320) runs the training application (322) on the training data (325). The training data (325) includes a large selection of social media images (which may include the images from a social media website) that are labeled with the number of likes for each image. The model (327) is trained to predict the labels (number of likes) from input vectors extracted from the images in the training data (325). The input features for one image forms an input vector from which an output (in this case, a predicted number of likes) is generated by the model (327). The input vectors generated from the training data to train the model (327) are also used to generate the components (328) using a principal components analysis algorithm. The model (327) and the components (328) may be transmitted to the user application (360).

Harley Quinn opens up the user application (360), which displays the user interface (355). The user interface (355) includes the button (358). Selection of the button (358) prompts Harley Quinn to select the Harley Quinn image (362), which is then processed.

The Harley Quinn image (362) is processed to generate the Harley Quinn vector (365). The Harley Quinn vector (365) is processed with the model (327) to generate an output for the Harley Quinn vector (365), which does not satisfy a threshold, i.e., the predicted number of likes is below a threshold value. Harley Quinn may set the threshold to a specific number or a default number may be used. The default may be the average number of likes for the images from the training data (325).

After determining the output for the Harley Quinn vector (365) is too low (i.e., below the threshold), the user application (360) searches for the counterfactual vector (380) using the intermediate vectors (368). An intermediate vector is a copy of the Harley Quinn vector (365) with certain values changed in accordance with at least one of the components (328).

Input space values from the Harley Quinn vector (365) are converted to one or more component space values using the components (328). The component space values are adjusted and the adjustments are transformed back to the input space and applied to the Harley Quinn vector (365) to form one of the intermediate vectors (368). The intermediate vectors (368) are tested with the model (327) to see if the output from the intermediate vectors (368) satisfies the threshold.

An intermediate vector that satisfies the threshold becomes the counterfactual vector (380).

The counterfactual vector (380) is processed by the user application (360) to generate the recommendations (382). The counterfactual vector (380) may be processed by comparing the counterfactual vector (380) to the Harley Quinn vector (365) to identify the dimensions of the input space that include values that are changed between the Harley Quinn vector (365) and the counterfactual vector (380). The changed dimensions may be ordered based on the absolute value of the changes to the values for the dimensions. Each dimension may be mapped to one or more text strings that form the recommendations (382).

The user application (360) updates the user interface (355) to the user interface (385) to include the recommendations (382) as the recommendation text (387) and (388). The recommendation text (387) corresponds to a dimension that include a change in value between the Harley Quinn vector (365) and the counterfactual vector (380). The recommendation text (387) indicates that increasing the brightness may improve the number of likes for the Harley Quinn image (362). The recommendation text (388) corresponds to a different dimension with changed values between the Harley Quinn vector (365) and the counterfactual vector (380). The recommendation text (388) indicates that decreasing the luminosity may improve the number of likes for the Harley Quinn image (362).

Figure 4:
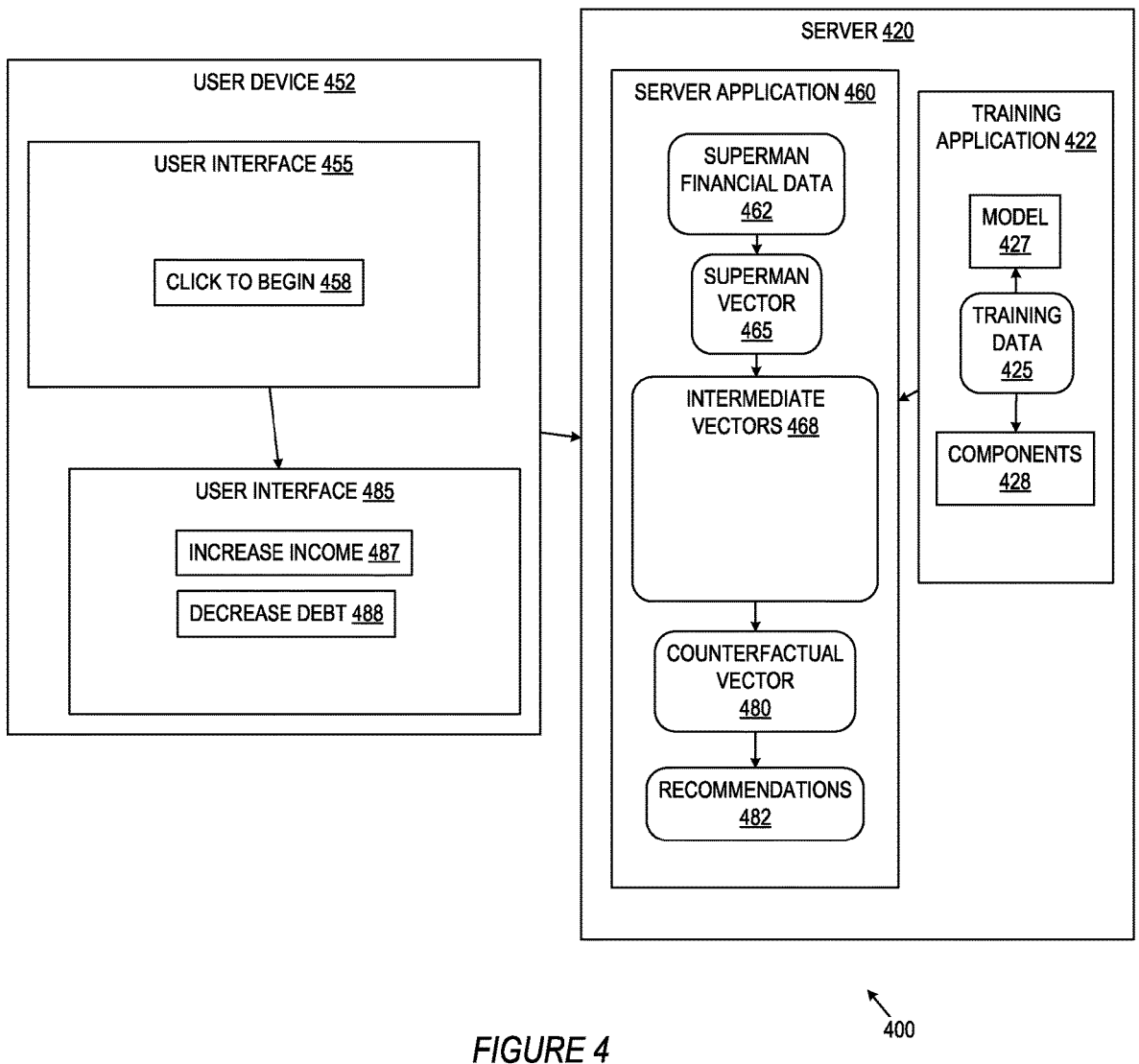

Turning to FIG. 4, the system (400) processes financial data to provide recommendations to improve applications. After saving a busload of nuns that got run off of a highway by a purple sportscar, Superman decides that he needs to move to a better neighborhood. Unfortunately, the application gets denied and Superman ponders whether to continue fighting crime. Fortunately, recommendations are provided using the system (400).

The company processing the application operates the server (420), which is used to train the model (427). The training application (422) trains the model (427) on the training data (425). The training data (425) includes a large selection of financial data for multiple people that have electronically submitted applications to the company. The records of the applications are labeled as "denied", "approved in arrears", and "approved in good standing". Input features are extracted from the training data (425) to generate training input vectors and labels. The model (427) is trained to predict the labels. The input features for set of financial data forms an input vector from which an output (in this case, a predicted categorical value) is generated by the model (427). The training input vectors are also analyzed with a principal component analysis algorithm to generate the components (428). The company exposes a website that users may log into, which provides access to the server application (460), which utilizes the model (427) and the components (428).

Superman uses his smartphone to access the server application (460) through the user interface (455). The user interface (455) includes the button (458). Selection of the button (458) prompts Superman to upload or otherwise allow access to the Superman financial data (462), which is then processed.

The Superman financial data (462) is processed to extract the Superman vector (465). The Superman vector (465) is processed with the model (427) to generate an output, which is not to the selected class of "approved in good standing". The model (427) is executed on the server (420), which helps to limit the risk of hacking by supervillains.

After determining the score of the Superman vector (465) is not to the selected class, the server application (460) searches for the counterfactual vector (480) using the intermediate vectors (468). An intermediate vector is a copy of the Superman vector (465) with certain values changed in accordance with at least one of the components (428).

Input space values from the Superman vector (465) are converted to one or more component space values using the components (428). The component space values are adjusted and the adjustments are transformed back to the input space and applied to the Superman vector (465) to form one of the intermediate vectors (468). The intermediate vectors (468) are tested with the model (427) to see if the output from the intermediate vectors (468) are to the selected class. An intermediate vector that satisfies the threshold becomes the counterfactual vector (480).

The counterfactual vector (480) includes two changes from the Superman vector (465), i.e., two of the dimensions included changed values to form the counterfactual vector (480) from the Superman vector (465). The recommendations (482) are identified from the changes between the Superman vector (465) and the counterfactual vector (480).

The user interface (455) is updated to the user interface (485) to include the recommendations (482) as the recommendation text (487) and (488) after processing the application submitted using the user device (452). The recommendation text (487) corresponds to a dimension that included a changed value and indicates that increasing the recorded amount of income may improve the outcome of an application to be approved. The recommendation text (488) corresponds to a different dimension of the input space and indicates that decreasing the amount of debt of the user may improve the outcome of the application.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output device(s) (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output device(s) (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
receiving a request corresponding to data, wherein an input vector is extracted from the data and wherein the input vector comprises an input feature comprising one or more of size, resolution, brightness, clarity, sharpness, saturation, hue, luminosity, and classification;
processing the input vector with a model to generate an output vector that corresponds to a class that is not a particular selected class;
processing the input vector using a component, of a plurality of components of a component vector space, and a processor that generates a counterfactual vector to the class,
wherein the component vector space comprises a number of dimensions that is less than a number of input features of the input vector,
wherein a principal component analysis generates a reduced search space used to find the counterfactual vector, the reduced search space being the component vector space defined by the plurality of components instead of a search space having the number of input features of the input vector, and
wherein the counterfactual vector is generated by searching the reduced search space, wherein generating the counterfactual vector comprises:
determining a value of the component by combining the input vector with a weight vector of the component,
adjusting the value of the component to generate an adjusted value of the component,
transforming the adjusted value of the component into an adjusted value of the input vector to generate an intermediate vector,
processing the intermediate vector with a computational model to obtain intermediate output, determining whether the intermediate output corresponds to the selected class, and
recording the intermediate output as the counterfactual vector when the intermediate output is determined to correspond to the selected class;
processing the counterfactual vector to generate a recommendation, wherein the recommendation identifies a change to the data that when used in a subsequent request results in a subsequent output vector corresponding to the selected class;
presenting the recommendation; and
adjusting the data from which the input vector is extracted to alter the input feature using the recommendation.

2. The method of claim 1, further comprising:
processing a plurality of training vectors using the principal component analysis to generate the plurality of components, wherein the component comprises the weight vector and an expected variance ratio.

3. The method of claim 1, further comprising:
selecting a number of components, of the plurality of components, in which an explained variance ratio corresponding to the number of components satisfies a variance threshold.

4. The method of claim 1, further comprising:
generating a plurality of component sets from k to K−1, wherein k is a number satisfying a variance threshold and K is the number of features of the input vector, wherein the plurality of components is from the plurality of component sets; and
recording the component from a component set, of the plurality of component sets, to the plurality of components with linear connections between the component and a plurality of features of the input vector.

5. The method of claim 1, further comprising:
generating a plurality of component sets; and
removing duplicate components from the plurality of component sets to form the plurality of components.

6. The method of claim 1, further comprising:
generating the counterfactual vector by searching a feature space of the input vector using linear connections between the input vector and the component to constrain adjustments to the input vector to generate the counterfactual vector.

7. The method of claim 1, further comprising:
initiating a search for the counterfactual vector by starting with the component, wherein the component corresponds to an explainable variance ratio.

8. The method of claim 1, further comprising:
searching a feature space using the component and one of a genetic algorithm and a k-d tree algorithm.

9. The method of claim 1, further comprising:
converting an input variable to a numeric value of the input vector.

10. The method of claim 1, further comprising:
presenting the recommendation with a link.

11. A system comprising:
a processor;
a counterfactual controller, wherein the counterfactual controller generates a counterfactual vector;
a recommendation controller, wherein the recommendation controller generates a recommendation;
an application executing on the processor and configured for:
receiving a request corresponding to data, wherein an input vector is extracted from the data and wherein the input vector comprises an input feature comprising one or more of size, resolution, brightness, clarity, sharpness, saturation, hue, luminosity, and classification;
processing the input vector with a model to generate an output vector that corresponds to a class that is not a selected class;
processing, by the counterfactual controller, the input vector using a component, of a plurality of components of a component vector space, to generate the counterfactual vector to the class,
wherein the component vector space comprises a number of dimensions that is less than a number of input features of the input vector,
wherein a principal component analysis generates a reduced search space used to find the counterfactual vector, the reduced search space being the component vector space defined by the plurality of components instead of a search space having the number of input features of the input vector, and
wherein the counterfactual vector is generated by searching the reduced search space, wherein generating the counterfactual vector comprises:
determining a value of the component by combining the input vector with a weight vector of the component,
adjusting the value of the component to generate an adjusted value of the component,
transforming the adjusted value of the component into an adjusted value of the input vector to generate an intermediate vector,
processing the intermediate vector with a computational model to obtain intermediate output,
determining whether the intermediate output corresponds to the selected class, and
recording the intermediate output as the counterfactual vector when the intermediate output is determined to correspond to the selected class;
processing, by the recommendation controller, the counterfactual vector to generate the recommendation, wherein the recommendation identifies a change to the data that when used in a subsequent request results in a subsequent output vector corresponding to the selected class;
presenting the recommendation; and
adjusting the data from which the input vector is extracted to alter the input feature using the recommendation.

12. The system of claim 11, wherein the application is further configured for:
processing a plurality of training vectors using the principal component analysis to generate the plurality of components, wherein the component comprises the weight vector and an expected variance ratio.

13. The system of claim 11, wherein the application is further configured for:
selecting a number of components, of the plurality of components, in which an explained variance ratio corresponding to the number of components satisfies a variance threshold.

14. The system of claim 11, wherein the application is further configured for:
generating a plurality of component sets from k to K−1, wherein k is a number satisfying a variance threshold and K is the number of features of the input vector, wherein the plurality of components is from the plurality of component sets; and recording the component from a component set, of the plurality of component sets, to the plurality of components with linear connections between the component and a plurality of features of the input vector.

15. The system of claim 11, wherein the application is further configured for:
generating a plurality of component sets; and
removing duplicate components from the plurality of component sets to form the plurality of components.

16. The system of claim 11, wherein the application is further configured for:
generating the counterfactual vector by searching a feature space of the input vector using linear connections between the input vector and the component to constrain adjustments to the input vector to generate the counterfactual vector.

17. The system of claim 11, wherein the application is further configured for:
initiating a search for the counterfactual vector by starting with the component, wherein the component corresponds to an explainable variance ratio.

18. The system of claim 11, wherein the application is further configured for:
searching a feature space using the component and one of a genetic algorithm and a k-d tree algorithm.

19. The system of claim 11, wherein the application is further configured for:
converting an input variable to a numeric value of the input vector.

20. A method comprising:
transmitting a request corresponding to data, wherein an input vector is extracted from the data and wherein the input vector comprises an input feature comprising one or more of size, resolution, brightness, clarity, sharpness, saturation, hue, luminosity, and classification;
receiving a response to the request, wherein the response is generated by:
processing the input vector with a model to generate an output vector that corresponds to a class that is not a selected class;
processing the input vector using a component, of a plurality of components of a component vector space, and a processor that generates a counterfactual vector to the class,
wherein the component vector space comprises a number of dimensions that is less than a number of input features of the input vector,
wherein a principal component analysis generates a reduced search space used to find the counterfactual vector, the reduced search space being the component vector space defined by the plurality of components instead of a search space having the number of input features of the input vector, and
wherein the counterfactual vector is generated by searching the reduced search space, wherein generating the counterfactual vector comprises:
determining a value of the component by combining the input vector with a weight vector of the component,
adjusting the value of the component to generate an adjusted value of the component,
transforming the adjusted value of the component into an adjusted value of the input vector to generate an intermediate vector,
processing the intermediate vector with a computational model to obtain intermediate output,
determining whether the intermediate output corresponds to the selected class, and
recording the intermediate output as the counterfactual vector when the intermediate output is determined to correspond to the selected class;
processing the counterfactual vector to generate a recommendation, wherein the recommendation identifies a change to the data that when used in a subsequent request results in a subsequent output vector corresponding to the selected class; and
presenting the recommendation;
adjusting the data from which the input vector is extracted to alter the input feature using the recommendation; and
displaying the response comprising the recommendation.

* * * * *